(12) United States Patent
Lui

(10) Patent No.: US 7,251,142 B2
(45) Date of Patent: Jul. 31, 2007

(54) TIMER SWITCH

(75) Inventor: David Ping Lai Lui, Hong Kong (HK)

(73) Assignee: Advanced Timer Technologies Limited, Kowloon (HK)

( * ) Notice: Subject to any disclaimer, the term of this patent is extended or adjusted under 35 U.S.C. 154(b) by 400 days.

(21) Appl. No.: 11/011,194

(22) Filed: Dec. 15, 2004

(65) Prior Publication Data
US 2006/0125324 A1   Jun. 15, 2006

(51) Int. Cl.
   *H05K 7/14*   (2006.01)
   *H05K 7/18*   (2006.01)

(52) U.S. Cl. ............... 361/797; 361/800; 361/681; 307/141

(58) Field of Classification Search .......... 361/790, 361/797, 752, 800, 681, 781, 139; 307/141; 368/262–269
See application file for complete search history.

(56) References Cited

U.S. PATENT DOCUMENTS 3,997,742 A  * 12/1976  Marquis ................. 200/38 FB
6,768,643 B1 *  7/2004  Rust et al. ................ 361/732

FOREIGN PATENT DOCUMENTS

JP         2005-353553 A   * 12/2002

* cited by examiner

*Primary Examiner*—Tuan Dinh
*Assistant Examiner*—Hung S. Bui
(74) *Attorney, Agent, or Firm*—Troxell Law Office, PLLC

(57) ABSTRACT

The present invention discloses a timer switch that uses an integrated circuit to control the time and a self-locking electromagnetic coil solenoid valve to drive the operation of a microswitch, which is particularly applicable to be installed on a wall as a timer switch. The switch device uses the electronic control of two 1.5V AA batteries to enter a set time through input keys, and a CPU will issue a pulse with very short timing of 30 ms to the solenoid to produce a magnetic field to drive a turning rod and open a primary switch in order to turn on or off a circuit.

2 Claims, 4 Drawing Sheets

TIMER SWITCH

FIELD OF THE INVENTION

The present invention relates to a timer switch, more particularly to a timer switch device being installed onto a wall and using an integrated circuit (IC) to control the time and a self-locking electromagnetic coil solenoid valve to drive a primary switch to move. The switch device installs two 1.5V AA batteries and sets the time directly from a plurality of external input keys, such that when the time is set, an integrated circuit (IC) issues a very short timing of 30 ms to the solenoid valve to drive the solenoid to produce a magnetic field and drive the primary switch to turn on or off a circuit.

BACKGROUND OF THE INVENTION

In many occasions, an external accessory or a specific device is used in a regular manner, such as a lamp that provides illumination, a cooling system, an inspecting instrument or a ventilator is run at a fixed time. Therefore, such device can be turned on or off by a timer switch instead of being operated manually. On one hand, it can save the trouble of repeatedly operating the device manually or prevent human errors, and thus a timer switch has its value.

In general, a traditional timer switch comprises components such as a timer, a driving motor, and a switch; wherein the timer controls the time, and the driving motor mainly includes a motor and a transmission screw rod, and the switch connects or disconnects a control circuit, and the transmission screw rod is rotated by the motor to be turned on or off. Therefore the traditional timer switch has the shortcomings of noisy motor rotation, long delay, power consuming battery and inconvenient set time. Due to the structural factor, a traditional timer is controlled by two lines: a power supply fire wire and a ground wire, and thus the installation will be more troublesome.

SUMMARY OF THE INVENTION

Therefore, the primary objective of the present invention is to provide a timer switch that can overcome the foregoing shortcomings.

DETAILED DESCRIPTION OF THE PREFERRED EMBODIMENTS

To make it easier for our examiner to understand the objective of the invention, its structure, innovative features, and performance, we use a preferred embodiment together with the attached drawings for the detailed description of the invention.

Figure 1:
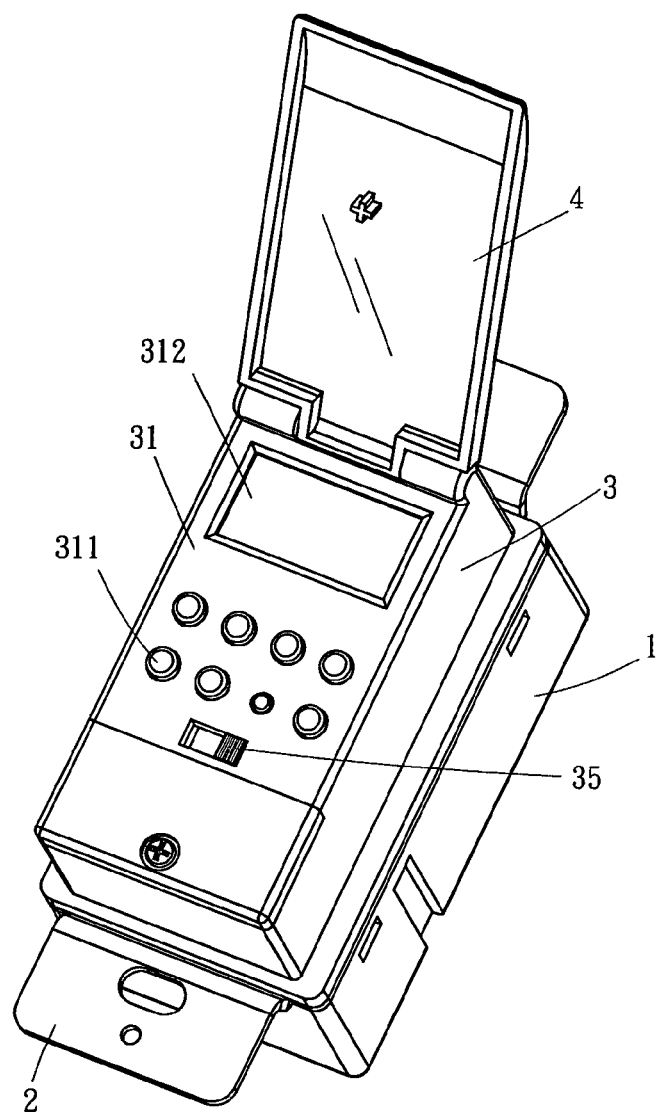
FIG. 1 is a perspective view of the timer switch of the invention.
Figure 2:
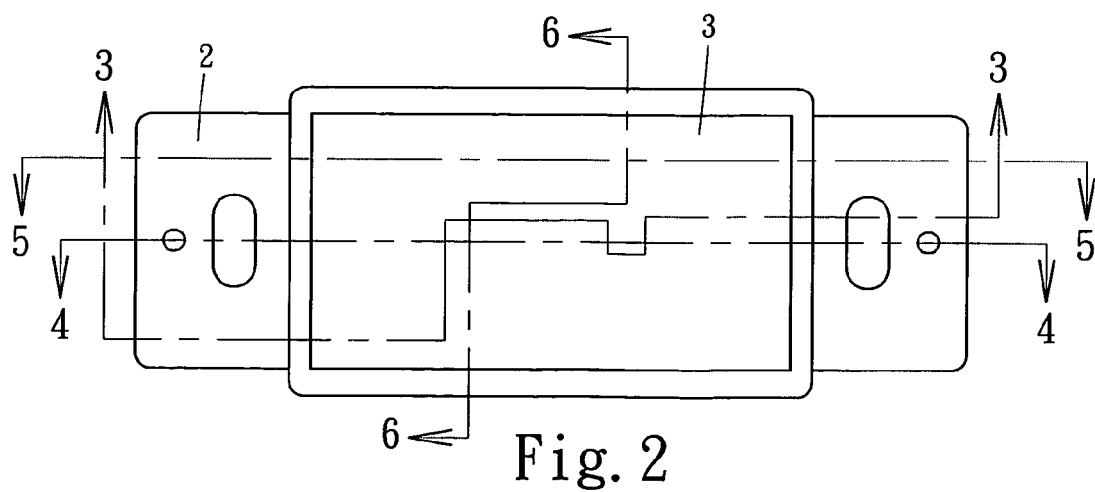
FIG. 2 is a top view of the timer switch of the invention.
Figure 3:
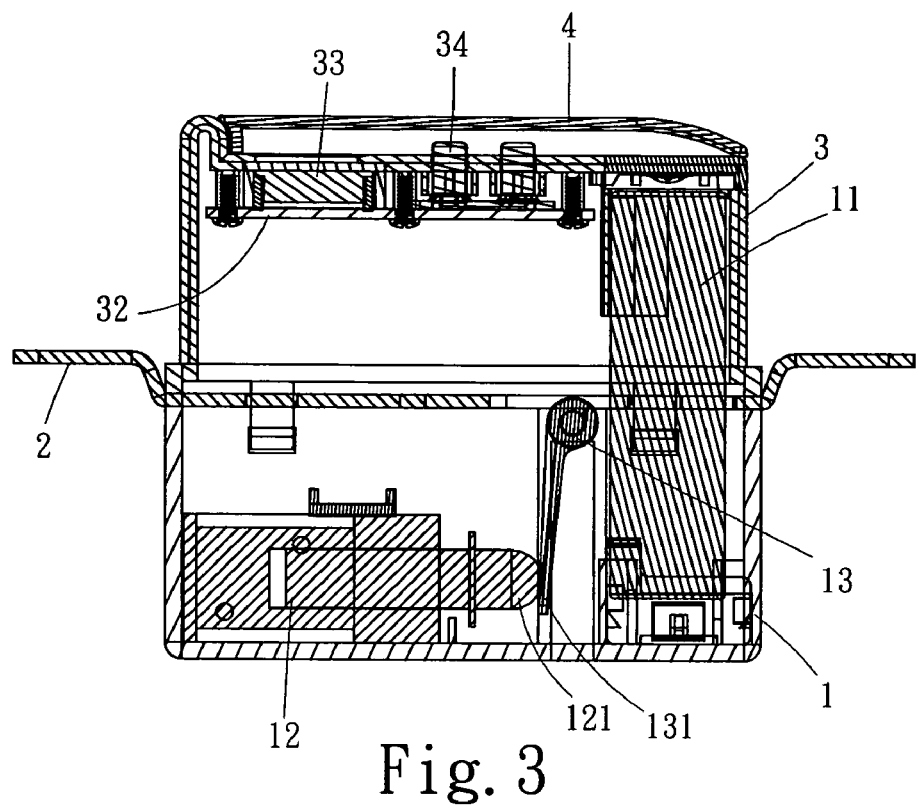
FIG. 3 is a sectional view of the timer switch of the invention.
Figure 4:
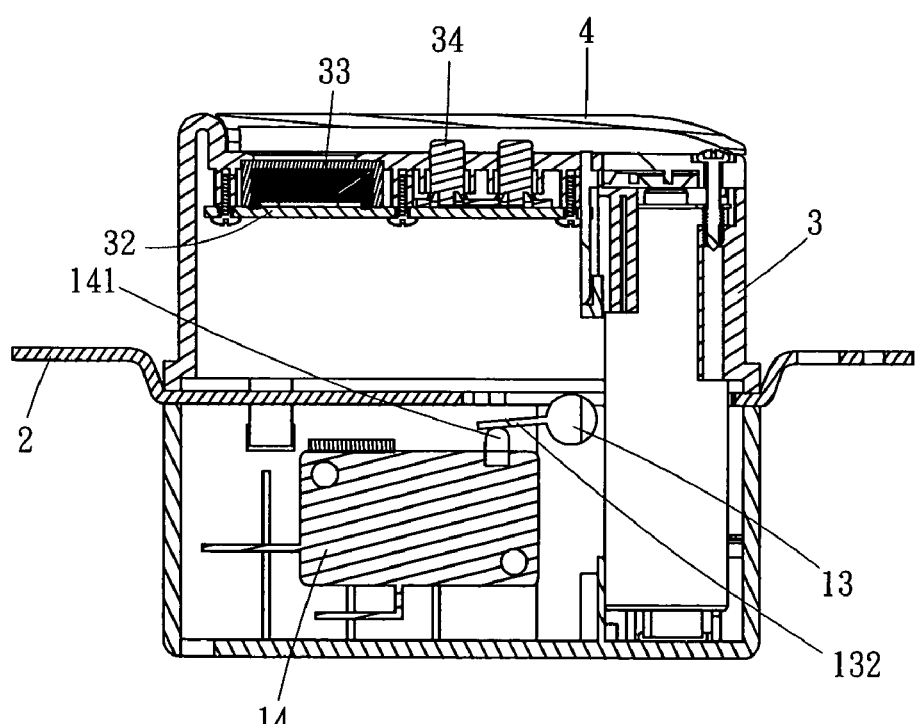
FIG. 4 is a sectional view of the timer switch of the invention.
Figure 5:
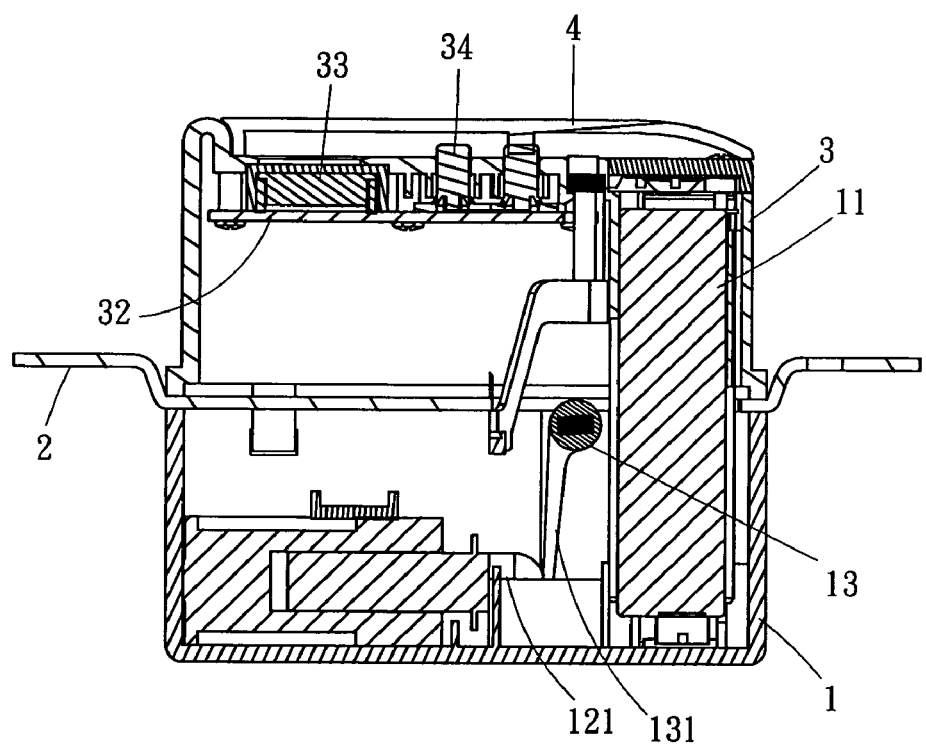
FIG. 5 is a sectional view of the timer switch of the invention.

In FIG. 1, the timer switch of the present invention comprises a lower casing bottom chassis 1, a fixing board 2, an upper casing 3 and a transparent external panel 4. The fixing board 2 is built into the top of the lower casing 1 to be fixed onto a wall, and the top of the fixing board 2 fixes the upper casing 3 into its position. The upper casing 3 has an operating panel 31 on its surface, and an external transparent panel 4 that can be rotated and opened.

In FIGS. 2 to 5, a size AA battery module 11 is installed on one side in the space between the upper casing 1 and the lower casing 3, and a circuit board 32 is installed in the upper casing 3. The circuit board 32 comprises an LCD display panel 33 and a rubber press key 34, and the LCD display panel 33 and the rubber press key 34 are extended to a panel 31 on the surface of the upper casing 3 for viewing the LCD display panel 33 from the outside and operating the rubber press key 34.

Figure 6:
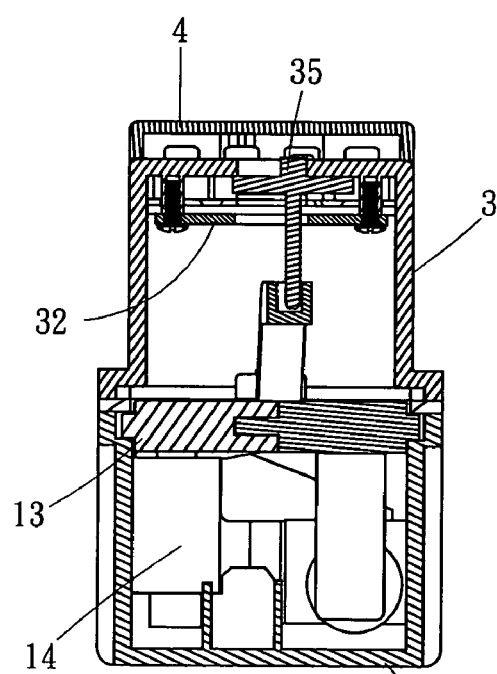
FIG. 6 is a sectional view of the timer switch of the invention.

In FIG. 6, a turning switch 35 is installed on the circuit board 32 for controlling to enable the standby mode of the solenoid.

The lower casing 1 comprises a solenoid valve 12, a turning rod 13 and a primary switch 14 therein, wherein the solenoid valve 12 has an axle 121 to be pushed forward or pulled backward as to contact an extended arm 131 of the turning rod 13 with an axle 121, and the other extended arm 132 of the turning rod 13 is in contact with a trigger key 141 of the primary switch 14. When the solenoid valve 12 is controlled by an integrated circuit IC disposed on the circuit board 32 to move the axle 121, the turning rod 13 is pushed, and one of the extended arms 132 pushes the trigger key 141 of the primary switch 14 to connect or disconnect a power supply.

Figure 7:
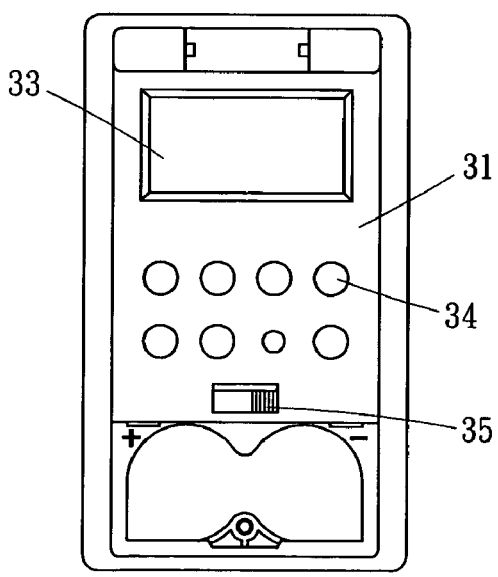
FIG. 7 is an illustrative view of the timer switch panel of the invention.

In FIG. 7, the panel 31 on the surface of the upper casing 3 has a plurality of rubber press keys 34 and an LCD display panel 33.

Figure 8:
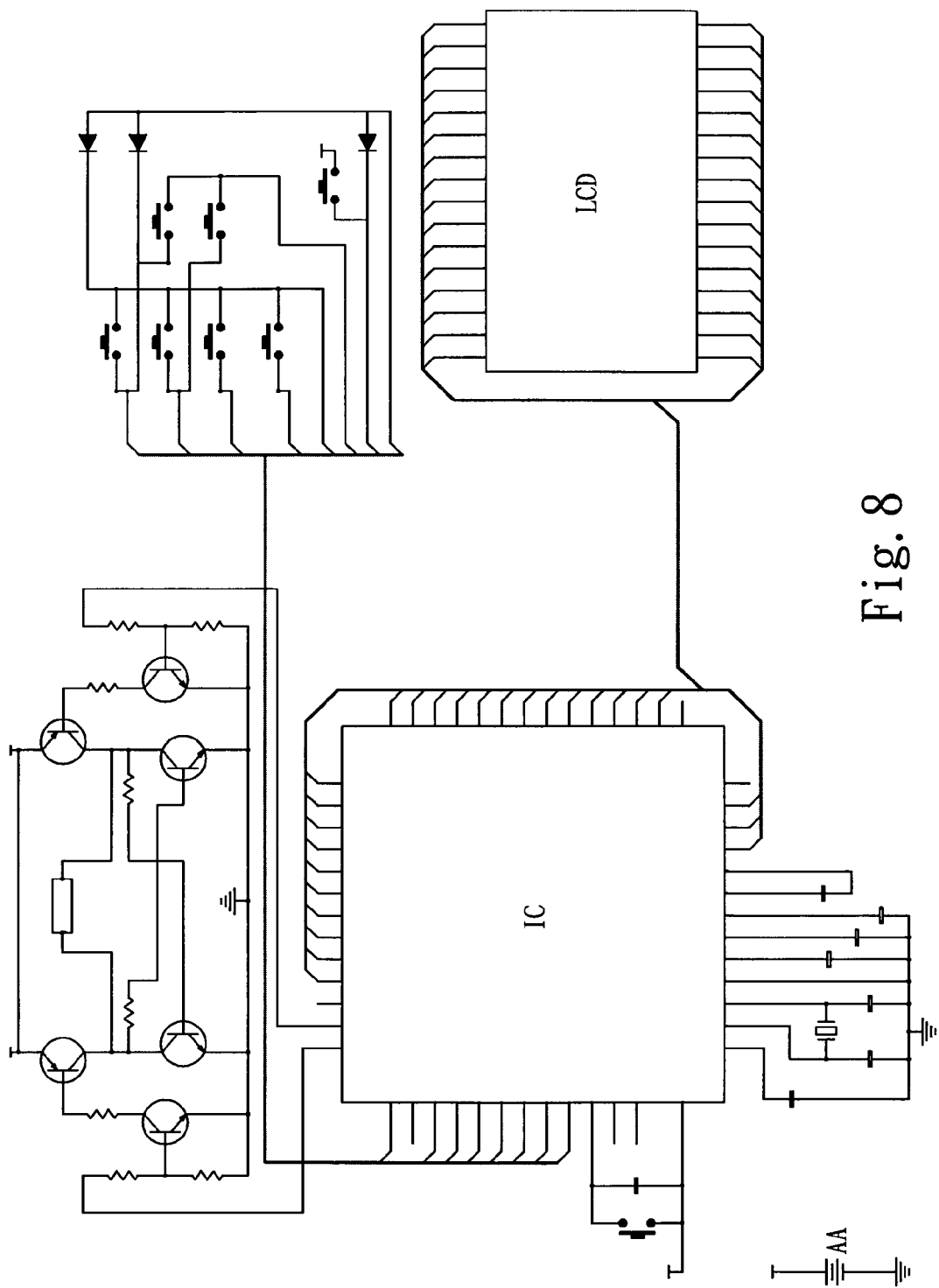
FIG. 8 is a circuit diagram of the electronic control of a timer switch of the invention.

In FIG. 8, the circuit on the circuit board 32 comprises a controller IC, an LCD display unit, and an input unit, such that a control data is entered externally from the input unit and the LCD display unit displays related information and the controller IC controls to start the solenoid valve 12 and controls said primary switch 14 to connect or disconnect a power supply.

In summation of the description above, the present invention provides a timer switch that uses an integrated circuit (IC) to control the time and a self-locking magnetic coil solenoid valve to drive a primary switch and the timer switch is applicable to be installed onto a wall. The switch device installs two 1.5V AA batteries and allows users to enter a set time through input keys, and a CPU will issue a pulse with very short timing of 30 ms to the solenoid to produce a magnetic field to drive a turning rod and open a primary switch in order to turn on or off a circuit.

What is claimed is:
1. A timer switch, comprising a lower casing, a fixing board, an upper casing and an external transparent panel;
said fixing board, being disposed at the top of said lower casing and fixed onto a wall, and the top of said fixing board fixing said upper casing, and an operating panel being disposed on the surface of said upper casing, and said external transparent panel that can be rotated to open;

a size AA battery module, being disposed on one side in the space between said lower and upper casings, and a circuit board being fixed therein, and said circuit board comprising an LCD display panel and a rubber press key and said LCD display panel and said rubber press key being extended to the panel at the surface of said upper casing for viewing said LCD display panel and operating said rubber press key from the outside;

a turning switch, being disposed on said circuit board for controlling and enabling the standby mode of a solenoid;

a solenoid valve, a rotating rod and a primary switch being installed in said lower casing, and an axle of said solenoid valve selectively pushing forward and pulling backward as to contact with an extended arm of said turning rod, and another extended arm of said turning rod being in touch with a trigger key of said primary switch, such that when said solenoid valve is controlled by an integrated circuit (IC) to move said axle and push said turning rod to rotate, one of said extended arms pushes said trigger key of said primary switch to selectively control the connection and disconnection of a power supply.

2. The timer switch of claim 1, wherein said circuit board has a circuit comprising a controller IC, an LCD display unit, and an input unit, such that a control data is entered externally from said input unit and said LCD display unit displays related information and said controller IC controls to start said solenoid valve and controls said primary switch to selectively connect and disconnect a power supply.

* * * * *